(12) United States Patent
Chiang

(10) Patent No.: US 10,904,736 B1
(45) Date of Patent: *Jan. 26, 2021

(54) PRACTICE EMERGENCY CALL SYSTEM

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,881

(22) Filed: Jul. 17, 2019

(51) Int. Cl.
*H04W 4/90* (2018.01)
*H04L 29/06* (2006.01)
*H04W 24/06* (2009.01)

(52) U.S. Cl.
CPC .......... *H04W 4/90* (2018.02); *H04L 65/1016* (2013.01); *H04L 65/1069* (2013.01); *H04W 24/06* (2013.01)

(58) Field of Classification Search
CPC .... H04W 4/90; H04W 24/06; H04L 65/1016; H04L 65/1069
See application file for complete search history.

(56) References Cited

U.S. PATENT DOCUMENTS

| 8,078,137 | B2 * | 12/2011 | Manzardo | H04M 11/04 455/404.1 |
| 10,757,557 | B1 * | 8/2020 | Chiang | H04M 3/5116 |
| 2008/0132197 | A1 * | 6/2008 | Koepke | H04L 12/66 455/404.2 |
| 2008/0160953 | A1 * | 7/2008 | Mia | H04M 7/0057 455/404.2 |
| 2010/0297981 | A1 * | 11/2010 | Ballantyne | H04M 1/72536 455/404.2 |
| 2013/0331082 | A1 * | 12/2013 | Topaltzas | H04W 24/06 455/419 |
| 2015/0079924 | A1 * | 3/2015 | Lieu | H04W 4/90 455/404.2 |
| 2015/0289121 | A1 * | 10/2015 | Lesage | G08B 25/006 455/404.1 |

(Continued)

OTHER PUBLICATIONS

Little Bit Studio, LLC, "DialSafe Pro", retrieved on Jul. 16, 2019, available at <<https://apps.apple.com/us/app/dialsafe-pro/id438306615>>, Apple, Inc., 2011, 3 pages.

(Continued)

*Primary Examiner* — Steven S Kelley
(74) *Attorney, Agent, or Firm* — Lee & Hayes, P.C.

(57) ABSTRACT

An emergency call practice application can execute on user equipment (UE) to allow users to practice dialing 9-1-1 or other emergency numbers. In a network practice mode, the emergency call practice application can initiate a practice emergency call by sending a call setup message to an IP Multimedia Subsystem (IMS). The IMS can route the call setup message to a Public Safety Answering Point (PSAP) routing server, which can recognize a destination identifier in the call setup message as being associated with a test server instead of a PSAP. The PSAP routing server can forward the call setup message to the test server to connect the practice emergency call.

20 Claims, 11 Drawing Sheets

(56) References Cited

U.S. PATENT DOCUMENTS

2015/0341768 A1    11/2015  Dunn et al.
2016/0100435 A1*   4/2016   Bakker ............. H04M 3/42348
                                                      455/404.1

OTHER PUBLICATIONS

Little Bit Studio, LLC, "Ready Set Dial", retrieved on Jul. 16, 2019, available at <<https://apps.apple.com/us/app/ready-set-dial/id1435714699>>, Apple, Inc., 2019, 3 pages.
Office Action for U.S. Appl. No. 16/514,924, dated Dec. 30, 2019, Chiang, "Practice Emergency Call System", 6 Pages.

* cited by examiner

PRACTICE EMERGENCY CALL SYSTEM

BACKGROUND

A Public Safety Answering Point (PSAP) or other emergency services entities can be provided to respond to emergency calls from users. For example, a PSAP can receive an emergency call placed from a user equipment (UE) to an emergency number such as 9-1-1. If needed, PSAP personnel can respond to an emergency call by dispatching police, fire department, ambulance, and/or other emergency resources. Emergency calls to 9-1-1 or other emergency numbers can thus be an effective way to request emergency services when emergency situations arise.

A telecommunication network can be configured to connect emergency calls from UEs to PSAPs or other emergency services entities. Some countries have a main emergency number, such as 1-1-2, 9-1-1, or 9-9-9, for any type of emergency. Other countries have specific emergency numbers for certain types of emergency services. For example, some countries have one emergency number for police services and a separate emergency number for fire department and/or ambulance services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
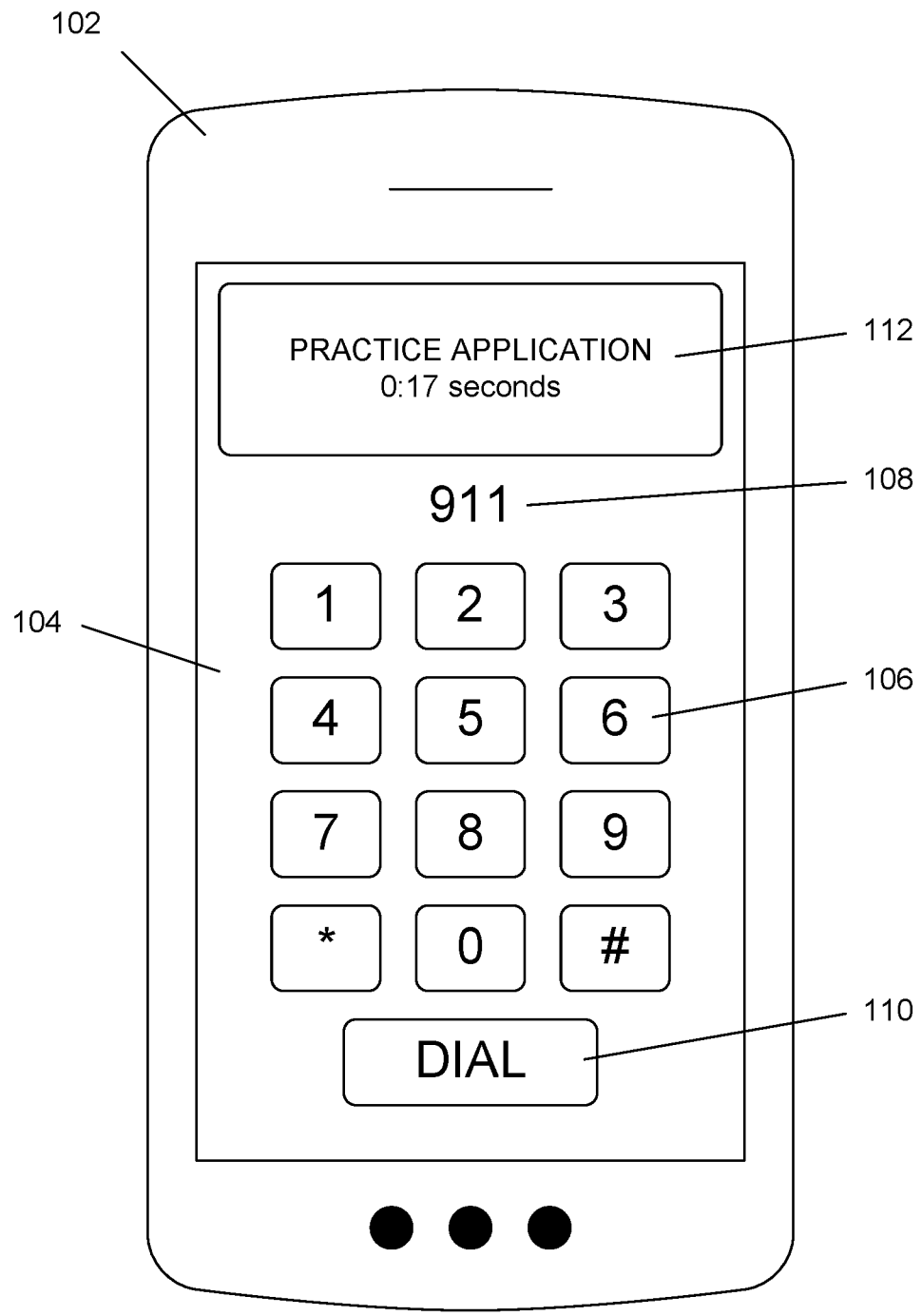
FIG. 1 depicts an example of a user equipment (UE) executing an emergency call practice application.

A telecommunications network can connect an emergency call from a user equipment (UE) to a Public Safety Answering Point (PSAP) or other recipient associated with emergency services. Fortunately, most users do not make emergency calls on a regular basis. However, due to a lack of experience making emergency calls, some users may not be confident that they will know how to dial 9-1-1 or another emergency number in the event of an emergency. Users may also want to teach children or other users how to dial 9-1-1 or other emergency numbers. Users who are traveling or roaming may also want to ensure that they know how to dial the local emergency numbers for their current location. As such, users may want to practice dialing 9-1-1 or other emergency numbers to increase their confidence that they know how to do so, to teach others how to do so, or for any other reason.

Nevertheless, users can be wary of practicing dialing emergency numbers, as users may be worried about accidentally placing emergency calls when no emergency actually exists. For example, practicing by entering 9-1-1 into a native phone dialer may lead to an actual emergency call being placed to a PSAP accidentally. Accidental calls to a PSAP can waste PSAP resources by taking PSAP time, manpower, and other resources away from real emergency calls. Even if a user of a UE hangs up quickly after accidentally making an emergency call when the user had only been attempting to practice dialing an emergency number, many PSAPs will call the UE back after a hang-up to determine if an emergency exists. This can waste time, manpower, and/or other resources of the PSAP. Network capacity and/or other resources of the telecommunication network can also be impacted by accidental emergency calls or responsive call-backs from PSAPs.

In other situations, users may want to practice dialing emergency numbers in order to verify whether their calls will be properly routed through a telecommunication network to a PSAP. For example, network engineers may want to test that network nodes will route an emergency call to a PSAP. Other users way want to verify that, although user interface indicators may show that their UE has good signal strength and their UE is able to browse the internet, voice calls including emergency calls can actually be completed. For instance, a user with medical concerns may want to verify that he or she can successfully contact a PSAP if needed. However, here again users can be wary of actually testing emergency calls, as real emergency calls placed for testing or practice reasons can waste real PSAP resources. In some situations, fines may also be levied for calling PSAPs when no emergency really exists, especially if frequent non-emergency calls are made to PSAPs for testing purposes only.

Some solutions for testing network routing of emergency calls have been developed that can avoid using PSAP resources. For example, telecommunication networks can provide network engineers with specialized test subscriber identity module (SIM) cards, and the telecommunication network or a third-party PSAP routing server can be configured to recognize emergency calls placed from UEs with those test SIM cards and redirect the emergency calls to alternate test destinations that act as simulated PSAPs instead of routing them to real PSAPs. However, if network nodes, such as nodes within the telecommunication network or a third-party PSAP routing server, are not properly configured to recognize identifiers of the test SIM cards, the test emergency calls can mistakenly be routed to real PSAPs and thus waste PSAP resources. In this situation, emergency call testing may also need to cease until misconfigured network nodes can be reconfigured. Additionally, such test SIM cards are often only valid for a relatively short period of time, such that new test SIM cards must be provisioned and provided to test engineers relatively frequently. In some situations, these types of test SIM cards may also be misconfigured or only have temporary overwrites that redirect calls to test destinations, such that test calls intended to go to test destinations may instead be routed to real PSAPs due to a misconfiguration or the unexpected expiration of a temporary overwrite. Accordingly, such current test methods may only be available to certain users who have been given specialized test SIM cards, only be available during time periods when the test SIM cards are valid and properly configured, and/or only be available when network nodes are configured to recognize individual test SIM cards.

Described herein are systems and processes by which users can practice dialing emergency calls without affecting resources of PSAPs. In some examples, a UE can execute an application that allows users to locally practice dialing one or more emergency numbers. In other examples, the UE application can be configured to place a practice emergency call that a telecommunication network can redirect to a test server instead of a real PSAP.

Example Environment

FIG. 1 depicts an example of a user equipment (UE) 102 executing an emergency call practice application 104. A UE 102 can be a computing device that can present a user interface of the emergency call practice application 104 on a display. For example, a UE 102 can be a mobile phone such as a smart phone or other cellular phone, a personal digital assistant (PDA), a tablet, a smart watch, or any other type of computing or communication device. In some examples, the UE 102 can be a phone or other computing device that can connect to a telecommunication network to make or receive telephone calls, and/or send or receive data. Example architecture for a UE 102 is illustrated in greater detail in FIG. 8 and is described in detail below with reference to that figure.

The emergency call practice application 104 can have a user interface that resembles or emulates a user interface of a native phone dialer of the UE 102, including a keypad 106, a dialed number display 108, and a dial button 110. The keypad 106 can have user-selectable elements for digits 0-9 and/or other characters. The dialed number display 108 can indicate digits have been entered by a user via the keypad 106. The dial button 110 can be a user-selectable element that can be selected to express a user's intent to initiate a practice call to a phone number shown in the dialed number display 108. In some examples, the emergency call practice application 104 can execute as a standalone application apart from a native phone dialer of a UE 102. However, in other embodiments, the emergency call practice application 104 can execute as an alternate mode of a native phone dialer of a UE 102. For example, a native phone dialer may have a toggle button or setting that converts the native phone dialer from being configured to place real calls to instead act as the emergency call practice application 104 described herein.

Although the user interface of the emergency call practice application 104 can resemble or emulate a native phone dialer, the user interface of the emergency call practice application 104 can also have one or more practice mode indicators 112. The practice mode indicators 112 can distinguish the emergency call practice application 104 from a native phone dialer, and indicate to a user that the user is not using the native phone dialer of the UE 102. Accordingly, the practice mode indicators 112 may dissuade a user from attempting to place an emergency call via the emergency call practice application 104 during a real emergency.

Practice mode indicators 112 can include messages, icons, colors, patterns, moving elements, timers, counters, and/or other visual or audio elements that indicate that the emergency call practice application 104 is not the native phone dialer of the UE 102. As shown in FIG. 1, in some examples a practice mode indicator 112 can include a timer that counts down from a preset starting value when the emergency call practice application 104 first executes and/or when a practice session begins through the emergency call practice application 104. When the timer reaches zero, the emergency call practice application 104 may display a visual message, play an audio message, and/or provide other indications to a user that the practice session has concluded, and/or prompt the user to exit the emergency call practice application 104. As an example, the emergency call practice application 104 may accept user input via the keypad 106 and/or dial button 110 during a practice session while the timer is counting down, but when the timer reaches zero the emergency call practice application 104 may indicate that the practice session has concluded, stop accepting user input via the keypad 106 and/or dial button 110, and/or prompt the user to exit the emergency call practice application 104. Accordingly, in a real emergency a user can be dissuaded from mistakenly attempting to use the emergency call practice application 104 instead of the native phone dialer of the UE 102 for longer than the timer's countdown period. The timer's countdown period may be five seconds, ten seconds, twenty seconds, thirty seconds, or any other period of time.

In some examples, the user interface of the emergency call practice application 104 can be configured to resemble or emulate a native phone dialer of an operating system of the UE 102, with the addition of at least one practice mode indicator 112. For example, when the UE 102 is an Apple iPhone™ running the Apple iOS™ operating system, the user interface of the emergency call practice application 104 can substantially mimic the user interface of a native iOS™ phone dialing application, with the addition of at least one practice mode indicator 112. As another example, when the UE 102 is a mobile phone that runs the Android™ operating system, the user interface of the emergency call practice application 104 can substantially mimic the user interface of a native Android™ phone dialing application, with the addition of at least one practice mode indicator 112.

In some examples, the emergency call practice application 104 can be configured with multiple user interface designs and can detect the type of hardware and/or operating system of the UE 102, such that the emergency call practice application 104 can determine which user interface design to display based on which design corresponds to the hardware and/or operating system of the UE 102. In other examples, the emergency call practice application 104 can have a single user interface design, or can change between multiple user interface designs based on user input, operating system settings, user preferences, or other factors.

Figure 2:
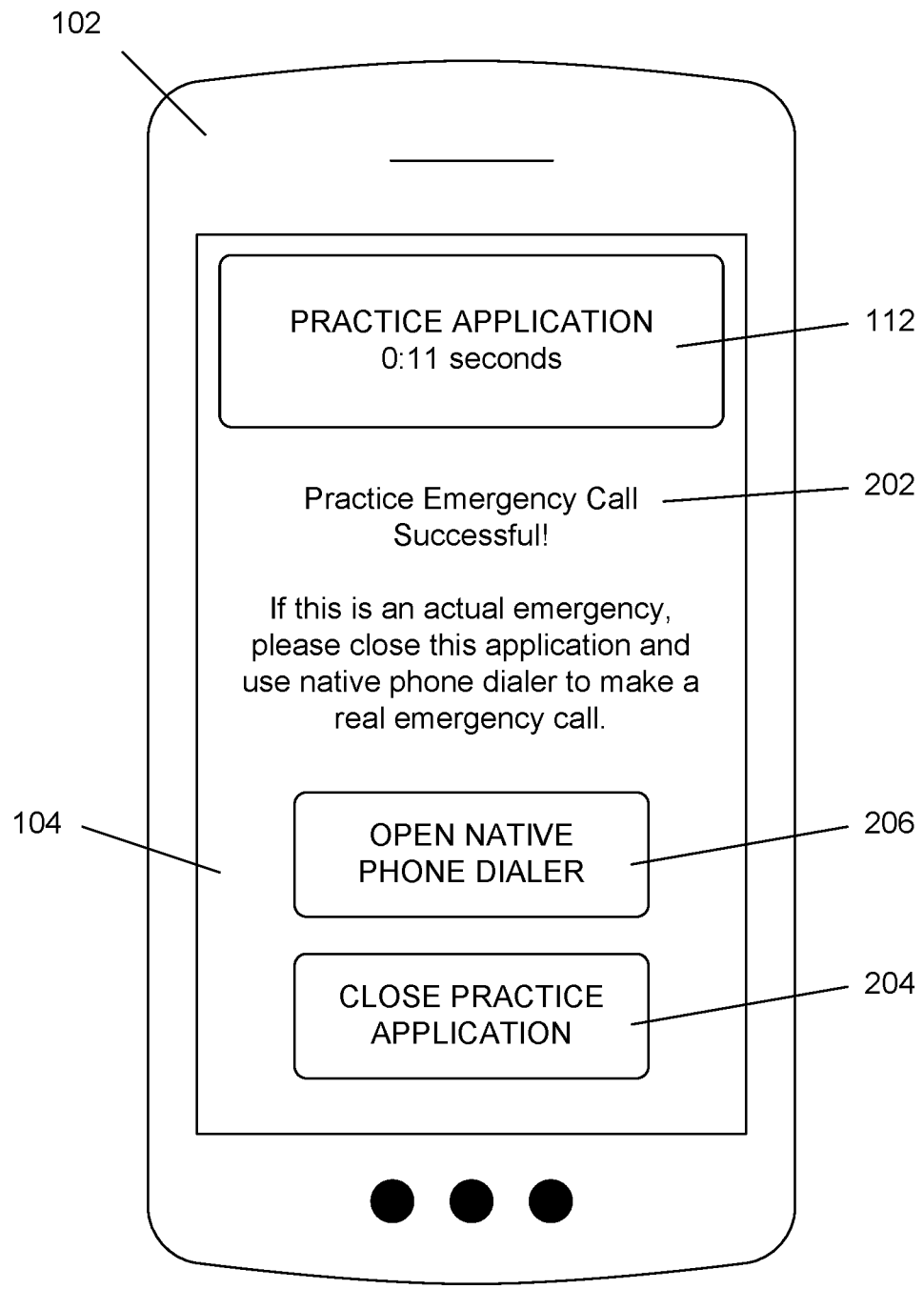
FIG. 2 depicts an emergency call practice application displaying example user feedback.

When a user inputs digits of a phone number via the keypad 106 and presses the dial button 110 in an attempt to dial the phone number shown in the dialed number display 108, the emergency call practice application 104 can compare the user-entered phone number against a stored list of one or more valid emergency numbers to determine if the user-entered phone number matches a valid emergency number. As shown in FIG. 2, if the emergency call practice application 104 determines that the user-entered phone number matches a valid emergency number, the emergency call practice application 104 can provide user feedback 202 indicating that the user successfully practiced placing an emergency call. The user feedback 202 can include a message, icon, or other visual feedback displayed in the user interface of the emergency call practice application 104, an audible message or sound played by the emergency call practice application 104 through a headset or speakers of the UE 102, vibrations or other haptic feedback, and/or any other type of feedback.

As shown in FIG. 2, when a user-entered phone number matches a valid emergency number, the emergency call practice application 104 may also present a user-selectable close option 204 that, when selected, causes the emergency call practice application 104 to exit. The user feedback 202 may prompt the user to exit the emergency call practice application 104 upon a successful practice session, to help inform the user that they have not placed an actual call. The user feedback 202 may also provide a suggestion that, if a real emergency situation is occurring, the user should use a native phone dialer to place a real emergency call, and/or the user interface can present a user-selectable native phone dialer option 206 that, when selected, causes the native phone dialer of the UE 102 to open so that a real call can be placed. Accordingly, in a real emergency situation, the user feedback 202, the close option 204, and/or the native phone dialer option 206 can assist a user in understanding that they may have mistakenly used the emergency call practice application 104 and prompt the user to retry the emergency call via the native phone dialer of the UE 102.

If the emergency call practice application 104 determines that a user-entered phone number does not match a valid emergency number, the emergency call practice application 104 can provide user feedback 202 indicating that the user did not successfully practice placing an emergency call, and may prompt the user to try again and/or provide additional instructions on how to dial a valid emergency number. In a situation in which the user-entered phone number does not match a valid emergency number, the emergency call practice application 104 may also present a close option 204 and/or a native phone dialer option 206.

The emergency call practice application 104 may have a stored list of emergency numbers, and set one or more as being valid for a practice session based on user settings, network information, or a current location of the UE 102. For example, a valid emergency number can be set as 9-1-1 if a user has set 9-1-1 as the emergency number to practice, or if network information or the current location of the UE 102 indicates that 9-1-1 is the local emergency number. In other examples, other numbers such as 1-1-2 or 9-9-9 can be set as a valid emergency number based on user settings, network information, and/or location information indicating that those other numbers are local emergency numbers or are emergency numbers to practice.

In some examples, multiple emergency numbers can be set as being valid. For example, to practice emergency calls for countries that have different emergency numbers for different emergency services, a set of those different emergency numbers can be set as being valid, and user feedback 202 presented when a user-entered phone number matches one of the set of valid emergency numbers may indicate which emergency service corresponds to the user-entered phone number.

Figure 3:
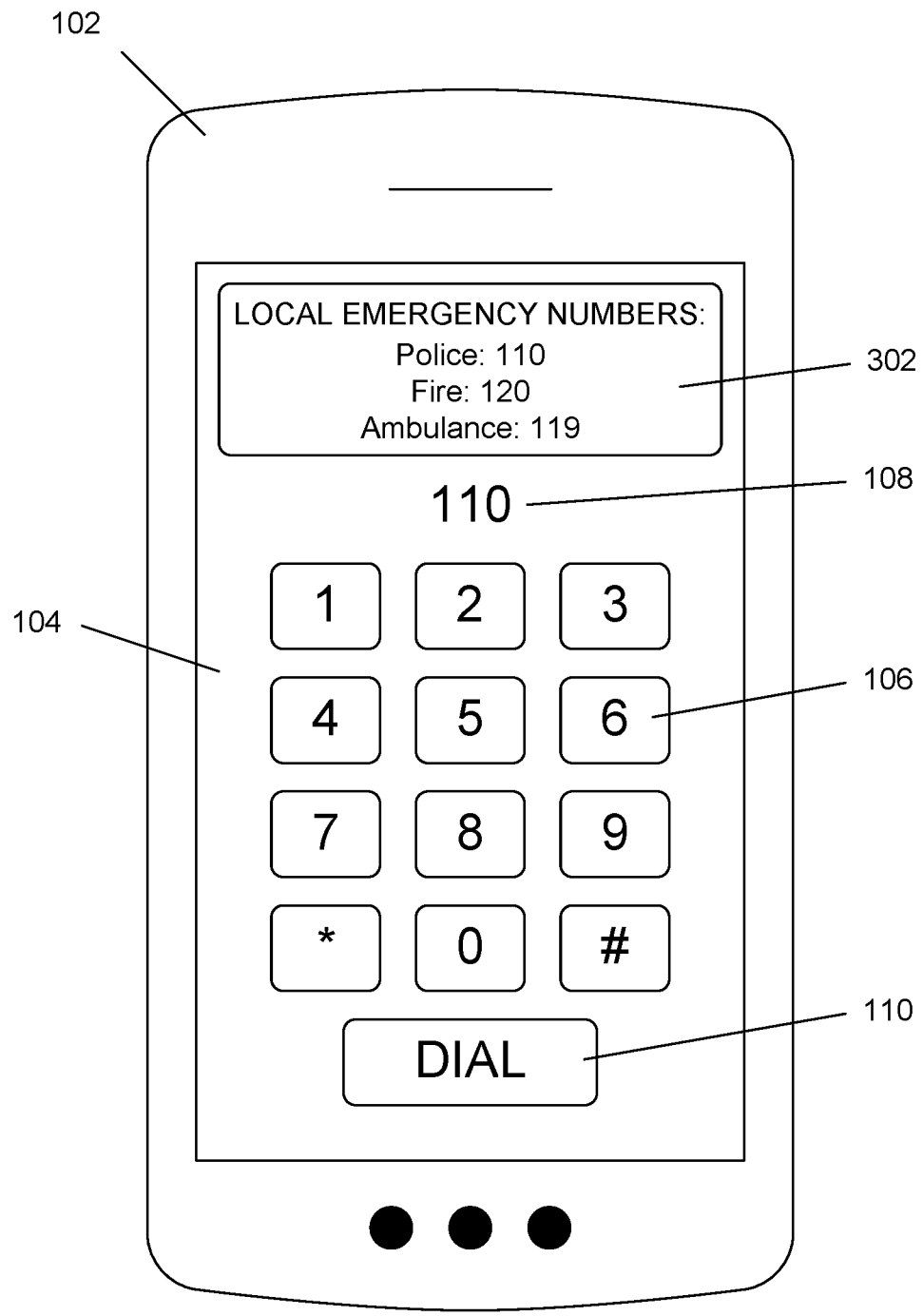
FIG. 3 depicts an emergency call practice application displaying an example local emergency number list.

As shown in FIG. 3, in some examples, the user interface of the emergency call practice application 104 may display a local emergency number list 302. The local emergency number list 302 can indicate one or more local emergency numbers for the current location of the UE 102. For example, the emergency call practice application 104 can use geolocation data of the UE 102 to determine the current location of the UE 102, look up one or more local emergency numbers corresponding to the current location of the UE 102 from a list in local memory or from a network-stored list, and display a local emergency number list 302 that includes one or more local emergency numbers for the current location of the UE 102. In other examples, a telecommunication network can provide one or more local emergency numbers to a UE 102 when the UE 102 attaches to the telecommunication network, and the local emergency numbers provided by the telecommunication network can be marked as valid emergency numbers to practice and/or emergency numbers to display in a local emergency number list 302. In some examples, crowdsourcing can be used to detect local emergency numbers based on network attachment messages or other data across multiple UEs 102, and crowdsourced information known to a network operator or provider of the emergency call practice application 104 about local emergency numbers for different geographical locations can be provided to individual instances of the emergency call practice application 104 during installation or during updates. The local emergency number list 302 can be included in a practice mode indicator 112, or be displayed as a separate element of the user interface of the emergency call practice application 104.

In some examples, a traveler who does not know the emergency numbers for his or her current location can open the emergency call practice application 104 to view local emergency numbers in a local emergency number list 302. In some examples, the emergency numbers displayed in the local emergency number list 302 can also be set as valid emergency numbers for a current practice session, such that the emergency call practice application 104 compares user-entered phone numbers against the one or more local emergency numbers displayed in a local emergency number list 302.

In some examples, the emergency call practice application 104 can be configured to compare user input against alternate types of input associated with initiating an emergency call. For example, rather than dialing digits of an emergency number, in some examples a UE 102 or a native phone dialer of the UE 102 can be configured to interpret a sequence of hardware button presses as a "silent dialing" initiation sequence for an emergency call, such as a sequence of one or more presses of one or more volume buttons, home buttons, power buttons, and/or other hardware buttons 402 on a UE 102. This may allow users to press a predefined hardware button sequence to make an emergency call in situations where they cannot see a screen of the UE 102 to press a touch-sensitive keypad 106 to enter digits of a phone number or want to place an emergency call without others seeing them dial digits of an emergency number. In other examples, a silent dialing "sequence" can be a press of a particular hardware button, or combination of hardware buttons, that is held for at least a predetermined length of time. Examples of silent dialing sequences for real emergency calls are described in more detail in U.S. patent application Ser. No. 16/364,860, filed on Mar. 26, 2019.

Figure 4:
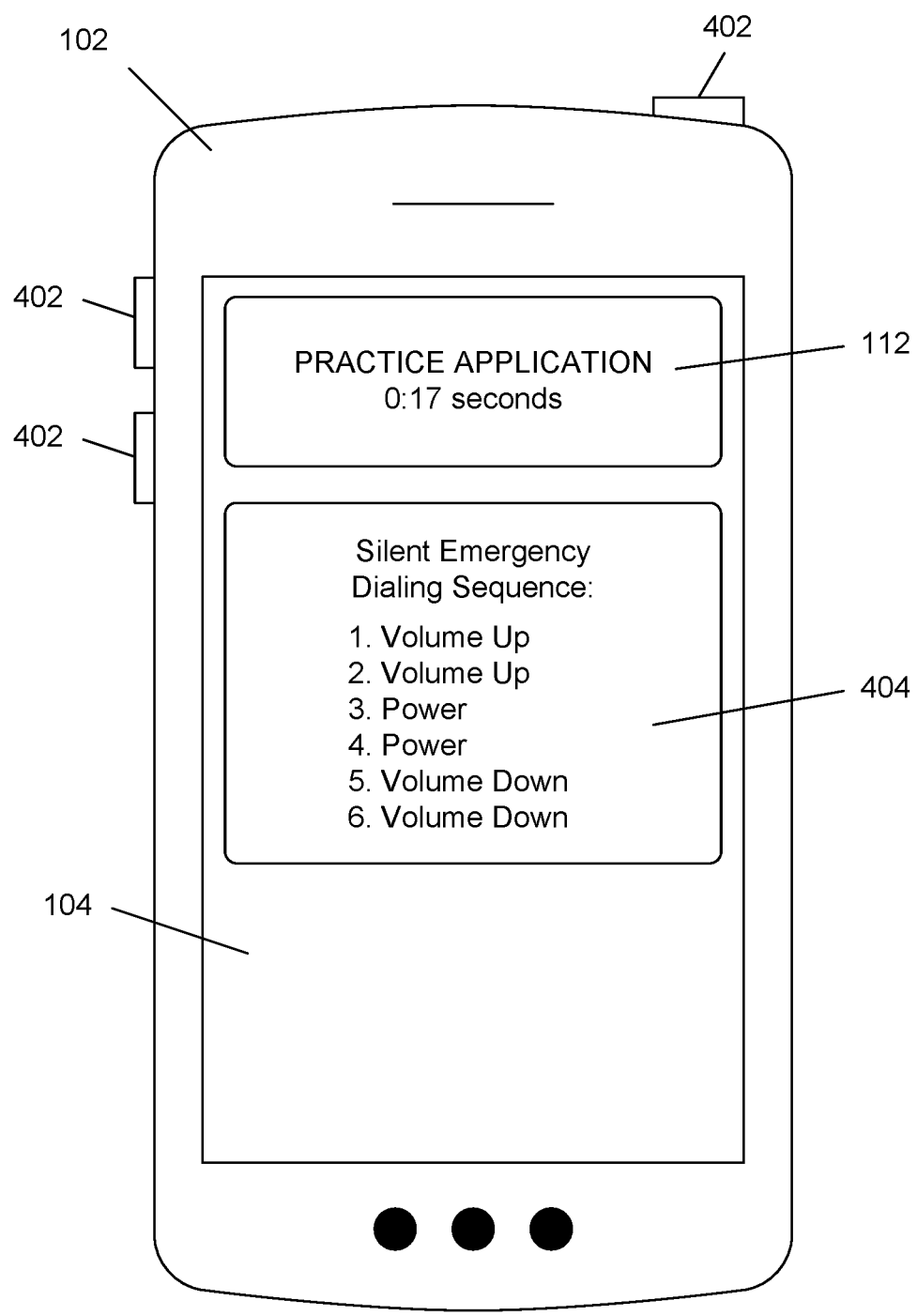
FIG. 4 depicts an emergency call practice application configured to practice silent dialing sequences to initiate emergency calls.

Accordingly, as shown in FIG. 4, during a practice session the emergency call practice application 104 can be configured to accept indications of presses of one or more hardware buttons 402 as user input, and can compare a sequence and/or length of such hardware button presses against predefined initiation sequences for emergency calls. Accordingly, the emergency call practice application 104 can allow users to practice entering hardware button sequences associated with initiation of emergency calls without actually initiating real emergency calls to a PSAP. The emergency call practice application 104 can be configured to intercept signals, operating system information, or other data about such hardware button presses during a practice session so that the sequence hardware button presses are not interpreted by the operating system, native phone dialer, or other element of the UE 102 as an indication that the user wants to actually initiate an emergency call.

As shown in FIG. 4, in some examples, the user interface of the emergency call practice application 104 can present a silent dialing sequence indicator 404 that informs a user of a hardware button sequence for initiating an emergency call. For example, the emergency call practice application 104 can, based on a hardware model and/or operating system of the UE 102, determine what hardware button sequence the UE 102 is configured to use as an initiation sequence for emergency calls, and display a silent dialing sequence indicator 404 that informs a user of that hardware button sequence in the user interface. Accordingly, the user can refer to the silent dialing sequence indicator 404 to learn what hardware button sequence to practice. In other situations, a user may choose to open the emergency call practice application 104 to view the silent dialing sequence indicator 404 as a reference for how to perform a silent dialing sequence on the UE 102 in other non-practice situations. The silent dialing sequence indicator 404 can be included in a practice mode indicator 112, or be displayed as a separate element of the user interface of the emergency call practice application 104.

Figure 5:
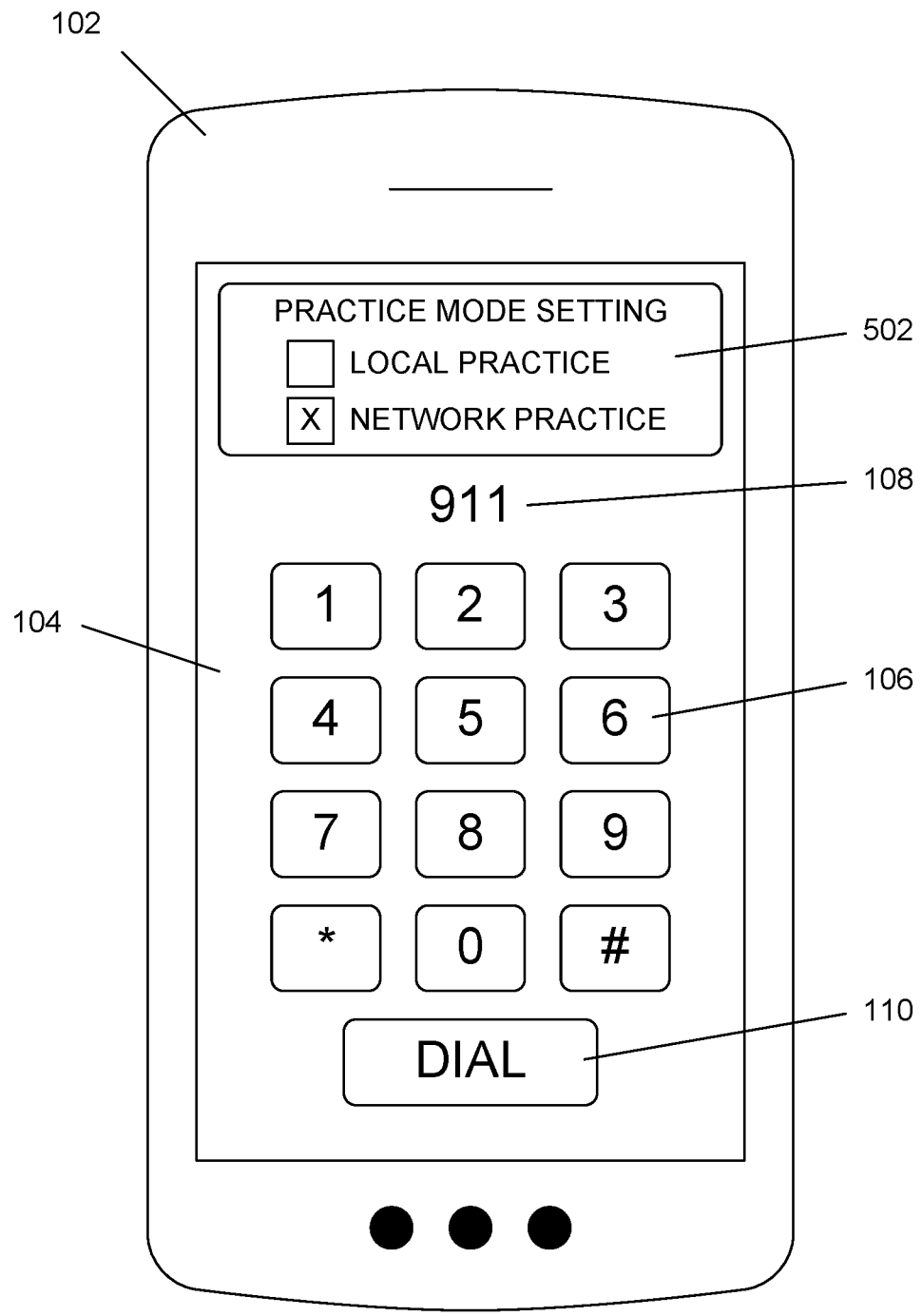
FIG. 5 depicts an emergency call practice application with a practice mode setting option to select between a local practice mode and a network practice mode.

As shown in FIG. 5, in some examples, the emergency call practice application 104 can have a user-selectable practice mode setting option 502 that a user can use to change the emergency call practice application 104 between a local practice mode and a network practice mode. In the local practice mode, the emergency call practice application 104 can locally compare a user-entered phone number against a list of one or more emergency numbers that are set as valid, as discussed above. However, as will be discussed further below, in the network practice mode, an emergency call can be practiced at least in part by sending data associated with a practice emergency call from the emergency call practice application 104 to a telecommunication network. In other examples, a telecommunication network can provide updates or setting configurations to remotely enable or disable a network practice mode for an emergency call practice application 104.

Figure 6:
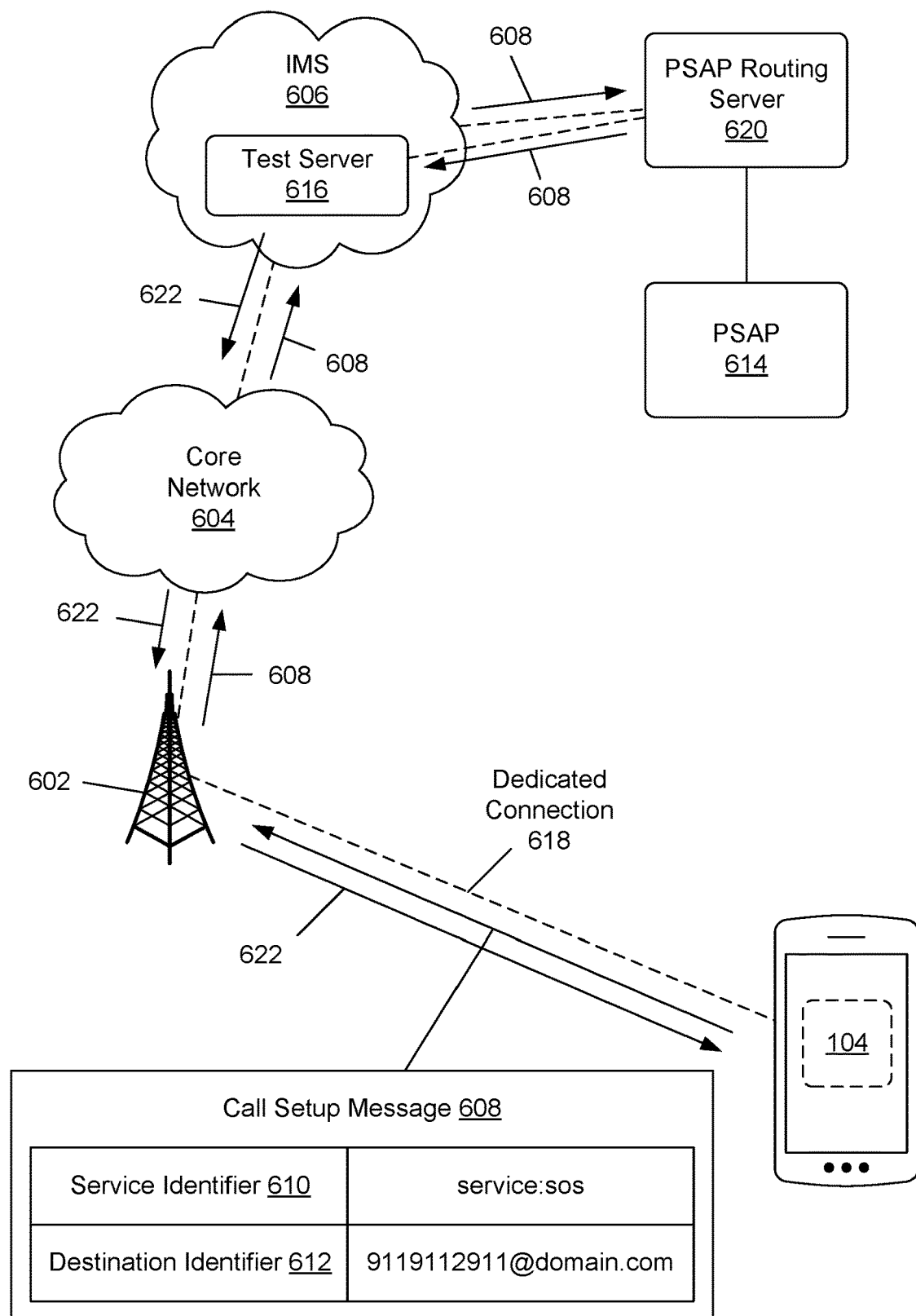
FIG. 6 depicts a first example network environment in which the emergency call practice application can be used to test the ability of a telecommunication network to route an emergency call.

FIG. 6 depicts a first example network environment in which the emergency call practice application 104 can be used to test the ability of a telecommunication network to route an emergency call. The emergency call practice application 104 can execute on a UE 102 that is connected to a telecommunication network as shown in FIG. 6, and can reach the telecommunication network when the emergency call practice application 104 is in the network practice mode discussed above with respect to FIG. 5.

The telecommunication network can have an access network 602 including base stations and/or other access points, as well as a core network 604 linked to the access network 602. The UE 102 can wirelessly connect to base stations or other access points of the access network 602, and in turn be connected to the core network 604. The access network 602 and/or core network 604 can be compatible with one or more radio access technologies, wireless access technologies, protocols, and/or standards. For example, wireless and radio access technologies can include fifth generation (5G) technology, Long Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology. An LTE base station in the access network 602 can be referred to as an evolved Node B (eNB), while a 5G base station can be referred to as a gNB. In some examples, the core network 604 can be a packet core network of an LTE network, which may be referred to as an Evolved Packet Core (EPC). In other examples, the core network 604 can be a 5G core.

The core network 604 can also be connected to an IP Multimedia Subsystem (IMS) 606. An IMS 606 can set up and/or manage communication sessions for UEs 102 that are connected to the core network 604, such as sessions for voice calls, video calls, messaging, or other types of communications. In particular, the IMS 606 can be configured to set up sessions for voice calls, including emergency calls, and can be considered to be a voice core network.

When a UE 102 executes the emergency call practice application 104 in a network practice mode, and a user dials a valid emergency number or presses a valid "silent dialing" hardware button sequence, the emergency call practice application 104 can generate a call setup message 608 to initiate a practice emergency call through the telecommunication network. For example, the call setup message 608 can be a Session Initiation Protocol (SIP) message, such as a SIP INVITE message. The call setup message 608 can be formatted to include the same types of information as a call setup message 608 that would be generated by a native phone dialer of the UE 102 for a real emergency call. For example, the 608 can include a service identifier 610 and/or a destination identifier 612. In some examples, the service identifier 610 and/or the destination identifier 612 can be within header fields of the call setup message 608. The call setup message 608 may also include other information in a header and/or a body, such as a phone number or other identifier of the UE 102 as the sender of the call setup message 608.

The service identifier 610 can be a uniform resource name (URN) or other type of data that identifies the call setup message 608 as being associated with an emergency call, although here the emergency call is a practice emergency call being made for practice or testing purposes. For example, the service identifier 610 can be a "service:sos" text string in the call setup message 608, which can be associated with emergency services.

In some examples, such as when different local emergency numbers are available in a location for different types of emergency services as discussed above with respect to FIG. 3, the emergency call practice application 104 can include a service identifier 610 that matches a specific type of emergency service associated with the dialed emergency number. For instance, the emergency call practice application 104 can use "service:sos.ambulance" as the service identifier 610 if a user dialed a local emergency number specific to ambulance services in the emergency call practice application 104, but use "service: sos.fire" as the service identifier 610 if a user dialed a local emergency number specific to fire department services in the emergency call practice application 104. However, if the user dialed a valid emergency number associated with all types of emergency services, for instance in locations such as the United States that only use one main emergency number like 9-1-1 for all emergency services, the emergency call practice application 104 can use a more general service identifier 610 such as "service:sos."

The destination identifier 612 can be an address, uniform resource identifier (URI), or other type of identifier associated with a destination of the call setup message 608. Although a native phone dialer may use a destination identifier 612 in a call setup message 608 that is associated with one or more PSAPs 614 when a user dials an emergency number, here the emergency call practice application 104 can instead use a specialized destination identifier 612 in a call setup message 608 that is specifically associated with a test server 616 instead of real PSAPs 614. For example, the destination identifier 612 of the test server 616 can be different from identifiers of real PSAPs 614.

The test server 616 can be located in the IMS 606 or at another network location, and can be associated with a test phone number or other test identifier. For example, the test server 616 can be associated with a test phone number such as "911-911-2911" rather than an emergency number such as 9-1-1. As another example, different test servers 616 can be provided that correspond to different emergency numbers for different types of emergency services, for example a first test server 616 having a test phone number of "110-110-2110" for a local police services emergency number of 1-1-0 and a second test server 616 having a test phone number of "120-120-2120" for a local ambulance services emergency number of 1-2-0. A test server 616 may also be associated with a particular domain name, such as a domain name associated with the IMS 606 or an operator of the telecommunication network. In some examples, the identifier of the test server 616 can be a combination of a test phone number and a domain name, such as "9119112911@example.com."

Accordingly, when a user dials a valid emergency number, such as 9-1-1, in the emergency call practice application 104, the emergency call practice application 104 can use an identifier specifically associated with the test server 616 as the destination identifier 612 in the call setup message 608. For example, instead of using "911" or other identifiers for actual PSAPs 614 that may be known to the UE 102, the emergency call practice application 104 can generate the call setup message 608 with a specialized destination identifier 612 such as "9119112911@example.com" that is specifically associated with the test server 616.

In some examples, a native phone dialer of the UE 102 can be configured to send a similar call setup message 608 with a service identifier 610 and a destination identifier 612 for a test server 616 when a user dials a test phone number specifically associated with the test server 616. For example, although the emergency call practice application 104 can be configured to generate a call setup message 608 with a destination identifier 612 of "9119112911@example.com" when a user dials a short emergency number such as 9-1-1, a native phone dialer of the UE 102 can also be configured to generate a call setup message 608 with a destination identifier 612 of "9119112911@example.com" when a user dials the test server's full test number of 911-911-2911 in the native phone dialer of the UE 102.

The call setup message 608 generated by the emergency call practice application 104 can be transmitted from the UE 102 to the access network 602. As shown in FIG. 6, in some examples, a dedicated connection 618 between the UE 102 and the access network 602 and/or core network 604 can be established to transmit the call setup message 608 generated by the emergency call practice application 104 to the access network 602. The dedicated connection 618 can be a prioritized type of connection that would be used for real emergency calls.

Base stations and/or other elements of an access network 602, and/or nodes of a core network 604, can have dedicated resources for emergency or high priority calls, such that such emergency or high priority calls are given priority over other types of calls so that they may be less likely to fail even if the access network 602 or core network 604 is congested. For example, a dedicated connection 618 can be established over a dedicated emergency bearer, a dedicated emergency packet data network (E-PDN) session in LTE networks, and/or a dedicated emergency protocol data unit (E-PDU) session in 5G networks. In some examples, a dedicated connection 618 can be set up using data including an Allocation and Retention Priority (ARP) value that indicates a high priority of an emergency bearer to be created for a session. In other examples, a dedicated connection 618 can be set up as a Wireless Priority Service (WPS) connection, or other type of high-priority connection.

In some examples, the emergency call practice application 104 can output a generated call setup message 608 to other elements of the UE 102 associated with SIP messaging or other types of call setup messaging. The UE 102 can detect the inclusion of a service identifier 610 such as "service:sos" associated with emergency services. Based on the service identifier 610, the UE 102 can determine that an emergency call is being requested and determine that a dedicated connection 618 with the access network 602 and/or core network 604 should be established to transmit data associated with an emergency call. The UE 102 may accordingly transmit a new network attach request or other data indicating that a dedicated connection 618 should be established for a session for the emergency call. In some examples, the emergency call practice application 104 can execute as a practice mode of a native phone dialer of the UE 102 in the situation shown in FIG. 6, such that the native phone dialer can cause the UE 102 to set up a dedicated connection 618 as it would for a real emergency call dialed through the native phone dialer. Once a dedicated connection 618 has been established, the UE 102 can transmit the call setup message 608 to the access network 602 via the dedicated connection 618.

Some UEs 102 may normally be configured to enter an emergency call mode upon transmitting a call setup message 608 associated with an emergency call, or upon other trigger conditions associated with emergency calls. For example, some UEs 102 can be configured to block incoming calls when the UE 102 is currently engaged in an emergency call, so that the emergency call is not interrupted. As another example, some UEs 102 can be configured disallow or limit data transmissions, exit some or all running applications, or take other steps to limit power consumption while the UE 102 is engaged in an emergency call. However, because here the call setup message 608 is being transmitted to engage in a practice emergency call instead of a real emergency call, the emergency call practice application 104 can instruct the UE 102 not to enter such an emergency call mode when transmitting the call setup message 608 for the practice emergency call.

The call setup message 608 can be routed through nodes of the access network 602 and the core network 604 to the IMS 606. Based on the service identifier 610 and/or the destination identifier 612, in some examples, nodes of the IMS 606 can forward the call setup message 608 to a PSAP routing server 620. The PSAP routing server 620 can be configured to route call setup messages 608 associated with real emergency calls to PSAPs 614. For example, the PSAP routing server 620 may be configured to review location information in a call setup message 608 for a real emergency call to determine which PSAP 614 is closest to the current location of the UE 102, and route the call setup message 608 for the emergency call to that particular PSAP 614 so that the emergency call can be connected. However, here the PSAP routing server 620 can also be configured to, when the destination identifier 612 of a call setup message 608 is associated with the test server 616 instead of real PSAPs 614, route the call setup message 608 to the test server 616 instead of a real PSAP 614.

In some examples, the PSAP routing server 620 can be a third-party server that is not operated by the operator of the IMS 606 or the telecommunication network. For example, the PSAP routing server 620 may be a third-party server that handles emergency call traffic from one or more network operators. However, the third-party server can be configured to recognize destination identifiers 612 associated with test servers 616 operated by one or more network operators, such that the third-party server can route call setup messages 608 with those destination identifiers 612 to corresponding test servers 616. However, in other examples, the PSAP routing server 620 can be an application server or other element within the IMS 606, or otherwise be operated by the operator of the telecommunication network. In still other examples, nodes of the IMS 606 can route the call setup message 608 directly to the test server 616 without going through a PSAP routing server 620.

The test server 616 can be registered with the PSAP routing server 620 as if the test server 616 were a real PSAP 614, apart from being associated with a unique destination identifier 612 instead of identifiers for PSAPs 614. For example, the PSAP routing server 620 can communicate with the test server 616 using the same types of connections and/or protocols it uses to communicate with real PSAPs 614, such as SIP and/or other protocols.

Accordingly, because the call setup message 608 for a practice emergency call generated by the practice emergency call application 104 has the same format and types of information as a call setup message 608 that would be generated by a native phone dialer of the UE 102 for a real emergency call, the call setup message 608 for the practice emergency call can be routed through the telecommunication network to the PSAP routing server 620 as if it were a call setup message 608 for a real emergency call. However, at the "last hop," the PSAP routing server 620 can determine that the call setup message 608 for the practice emergency call has a unique destination identifier 612 associated with the test server 616, and route the call setup message 608 to the test server 616 instead of a PSAP 614.

The test server 616 can respond to the call setup message 608 to connect to the practice emergency call with the UE 102. For example, based on an identifier of the UE 102 included in the call setup message 608, the test server 616 can send a response message 622, such as a "200 OK" SIP message, back to the UE 102 to confirm that it has received the call setup message 608 and/or to connect the practice emergency call. In some examples, the test server 616 can send the response message 622 to the UE 102 through the core network 604 and access network 602. In other examples, the test server 616 can send the response message 622 to the PSAP routing server 620, which can in turn forward the response message 622 to the UE 102 through the IMS 606, core network 604, and access network 602. In some examples, one or more additional messages can be exchanged between the UE 102 and the test server 616 to connect the practice emergency call.

Once the practice emergency call has been connected, in some examples the test server 616 can automatically play an audio message for the UE 102 that verifies that the practice emergency call was successfully connected. For example, the audio message can be a prerecorded audio message or Interactive voice response (IVR) message indicating that the practice emergency call was successful, and/or encourage a user of the UE 102 to use a native phone dialer on the UE 102 to make a real emergency call if a real emergency is occurring. In other examples, the audio message can be music, an audio tone, a sound, or any other type of audio indication of a successfully connected call. In some examples, the test server 616 may also, or alternately, respond to the call setup message 608 with information in a response message 622 that can be interpreted by the emergency call practice application 104 as indicating a successful call setup. For example, the test server 616 can include a predefined header value in a response message 622, and the emergency call practice application 104 can be configured to display user feedback 202 indicating a successful call setup when it recognizes the predefined header value in the response message 622.

Overall, because the call setup message 608 for the practice emergency call reached the PSAP routing server 620 through the telecommunication network, including passing through a dedicated connection 618, the access network 602, the core network 604, and the IMS 606, and because the routing only varied from a routing path a call setup message 608 for a real emergency call would take at the last hop from the PSAP routing server 620 to the test server 616 instead of to a real PSAP 614, a network engineer or other user can have confidence that a similar call setup message for a real emergency call would also be successfully routed through the telecommunication network at least to the PSAP routing server 620, where it would likely be forwarded to a real PSAP 614. Accordingly, at least a majority of the network routing path for an emergency call can be practiced or tested without risking a real connection to a real PSAP 614 that would waste PSAP resources.

Figure 7:
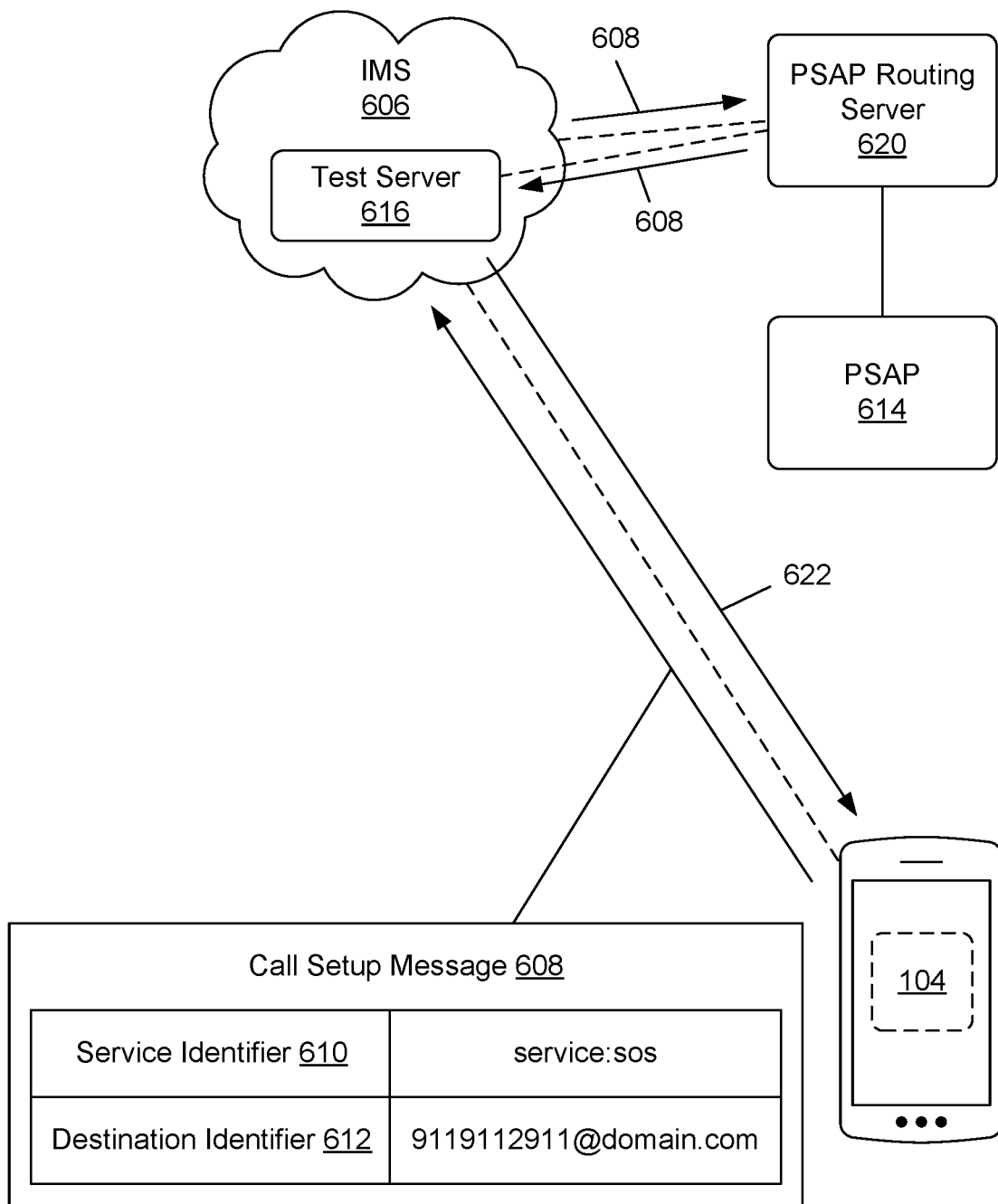
FIG. 7 depicts a second example network environment in which the emergency call practice application can be used to test the ability of a telecommunication network to route an emergency call.

FIG. 7 depicts a second example network environment in which the emergency call practice application 104 can be used to test the ability of a telecommunication network to route an emergency call. The emergency call practice application 104 can execute on a UE 102 that is connected to a telecommunication network as shown in FIG. 7, and can reach the telecommunication network when the emergency call practice application 104 is in the network practice mode discussed above with respect to FIG. 5.

In FIG. 7, the UE 102 may be connected to an IMS 606 via a different type of connection than shown in FIG. 6. For example, the UE 102 may be connected to the Internet via a Wi-Fi access point, and be able to communicate with nodes of the IMS 606 through the Internet rather than through a wireless connection to an eNB, gNB, or other base station of an access network 602 and/or through a core network 604 that is associated with a particular network operator. Accordingly, the UE 102 may reach the IMS 606 through the Internet without being connected through a prioritized dedicated connection 618 as discussed above with respect to FIG. 6. In other examples, the UE 102 may be connected to an access network 602 and core network 604 of a network operator without having established a dedicated connection 618. Accordingly, the UE 102 may reach the IMS 606 through a non-prioritized connection through a wireless telecommunication network.

As with the first network environment of FIG. 6, in the second network environment of FIG. 7 the emergency call practice application 104 can generate a call setup message 608 when a user uses the emergency call practice application 104 to dial a valid emergency number or the user presses a predefined "silent dialing" sequence of one or more hardware buttons 402 associated with an emergency number. The generated call setup message 608 can include a service identifier 610 and/or a destination identifier 612. The service identifier 610 can indicate that the practice emergency call is associated with general emergency services, such as "service:sos" when the dialed emergency number is a primary or generic emergency number in a location, or be a service identifier 610 associated with a particular type of emergency service when the dialed emergency number corresponds to that particular type of emergency service. The destination identifier 612 can be a unique identifier of a test server 616 that corresponds to the dialed emergency number.

The UE 102 can transmit the call setup message 608 generated by the emergency call practice application 104 to the IMS 606. As noted above, the UE 102 may transmit the call setup message 608 through a non-dedicated connection, such as Wi-Fi connection to the Internet or via a standard, non-prioritized, wireless connection to an access network 602 of a telecommunication network. In some examples, the UE 102 can establish an IMS PDN or PDU session with the IMS 606 to transmit the call setup message 608. As described above with respect to FIG. 6, the UE 102 may be configured to avoid entering an emergency call mode in which incoming calls are blocked, power conservation steps are taken, or other settings are changed, when the call setup message 608 originates from the emergency call practice application 104.

Based on the service identifier 610 and/or the destination identifier 612, nodes of the IMS 606 can forward the call setup message 608 to a PSAP routing server 620. As with the network environment of FIG. 6, the PSAP routing server 620 can be configured to route call setup messages 608 associated with real emergency calls to PSAPs 614, but determine that the destination identifier 612 of the call setup message 608 for the practice emergency call is instead associated with the test server 616. The PSAP routing server 620 can accordingly route the call setup message 608 to the test server 616 instead of a real PSAP 614.

The test server 616 can respond to the call setup message 608 to connect to the practice emergency call with the UE 102. For example, based on an identifier of the UE 102 included in the call setup message 608, the test server 616 can send a response message 622, such as a "200 OK" message, back to the UE 102 to confirm that it has received the call setup message 608 and/or to connect the practice emergency call. In some examples, the test server 616 can send the response message 622 directly to the UE 102 through an Internet connection or other type of connection that the UE 102 used to reach the IMS 606. In other examples, the test server 616 can send the response message 622 to the PSAP routing server 620, which can in turn forward the response message 622 to the UE 102 through the IMS 606 to the UE 102. In some examples, one or more additional messages can be exchanged between the UE 102 and the test server 616 to connect the practice emergency call.

Once the practice emergency call has been connected, in some examples the test server 616 can automatically play an audio message for the UE 102 that verifies that the practice emergency call was successfully connected. For example, the audio message can be a prerecorded or IVR audio message indicating that the practice emergency call was successful, and/or encourage a user of the UE 102 to use a native phone dialer on the UE 102 to make a real emergency call if a real emergency is occurring. In other examples, the audio message can be music, an audio tone, a sound, or any other type of audio indication of a successfully connected call. In some examples, the test server 616 may also, or alternately, respond to the call setup message 608 with information in a responsive call setup message 608 that can be interpreted by the emergency call practice application 104 as indicating a successful call setup. For example, the test server 616 can include a predefined header value in a responsive call setup message 608, and the emergency call practice application 104 can be configured to display user feedback 202 indicating a successful call setup when it recognizes the predefined header value in a responsive call setup message 608.

Although the second example network environment does not involve a dedicated connection 618 through an access network 602 and/or core network 604, the second example network environment can still route a call setup message 608 for a practice emergency call through nodes of an IMS 606, to a PSAP routing server 620, and to a test server 616 instead of a real PSAP 614. Accordingly, the second example network environment of FIG. 7 can allow users to test network routing of call setup messages 608 for emergency calls within the IMS 606 and/or PSAP routing server 620, without risking a real connection to a real PSAP 614 that would waste PSAP resources.

In some examples, user settings, network settings, a connection type, a network type, a network operator identity, and/or other factors can determine whether the UE 102 transmits a call setup message 608 for a practice emergency call from the emergency call practice application 104 to an access network 602 via a dedicated connection 618 as shown in FIG. 6 or through another type of connection to the IMS 606 as shown in FIG. 7. For example, when the UE 102 is connected to the Internet using a Wi-Fi connection and is not connected to an LTE or 5G network, the UE 102 or the emergency call practice application 104 may determine that the call setup message 608 is to be transmitted over a non-dedicated connection as shown in FIG. 7. However, if the UE 102 is connected to a base station of an access network 602 of an LTE or 5G network, the UE 102 or the emergency call practice application 104 may determine that a dedicated connection 618 is to be established and that the call setup message 608 is to be transmitted over such a dedicated connection 618 as shown in FIG. 6.

As another example, the emergency call practice application 104 can be set to use a dedicated connection 618 when the UE 102 is connected to an access network 602 of one network operator, but not use a dedicated connection 618 when the UE 102 is connected to an access network 602 of a different network operator. In other examples, user settings at the emergency call practice application 104 may indicate whether or not to set up a dedicated connection 618 to transmit a call setup message 608 from the emergency call practice application 104. In still other examples, a telecommunication network can remotely configure the emergency call practice application 104 and/or the UE 102 to use or not use a dedicated connection 618 to transmit a call setup message 608 from the emergency call practice application 104, for example if dedicated resources at a base station for emergency or high priority calls are already currently in use.

Example Architecture

Figure 8:
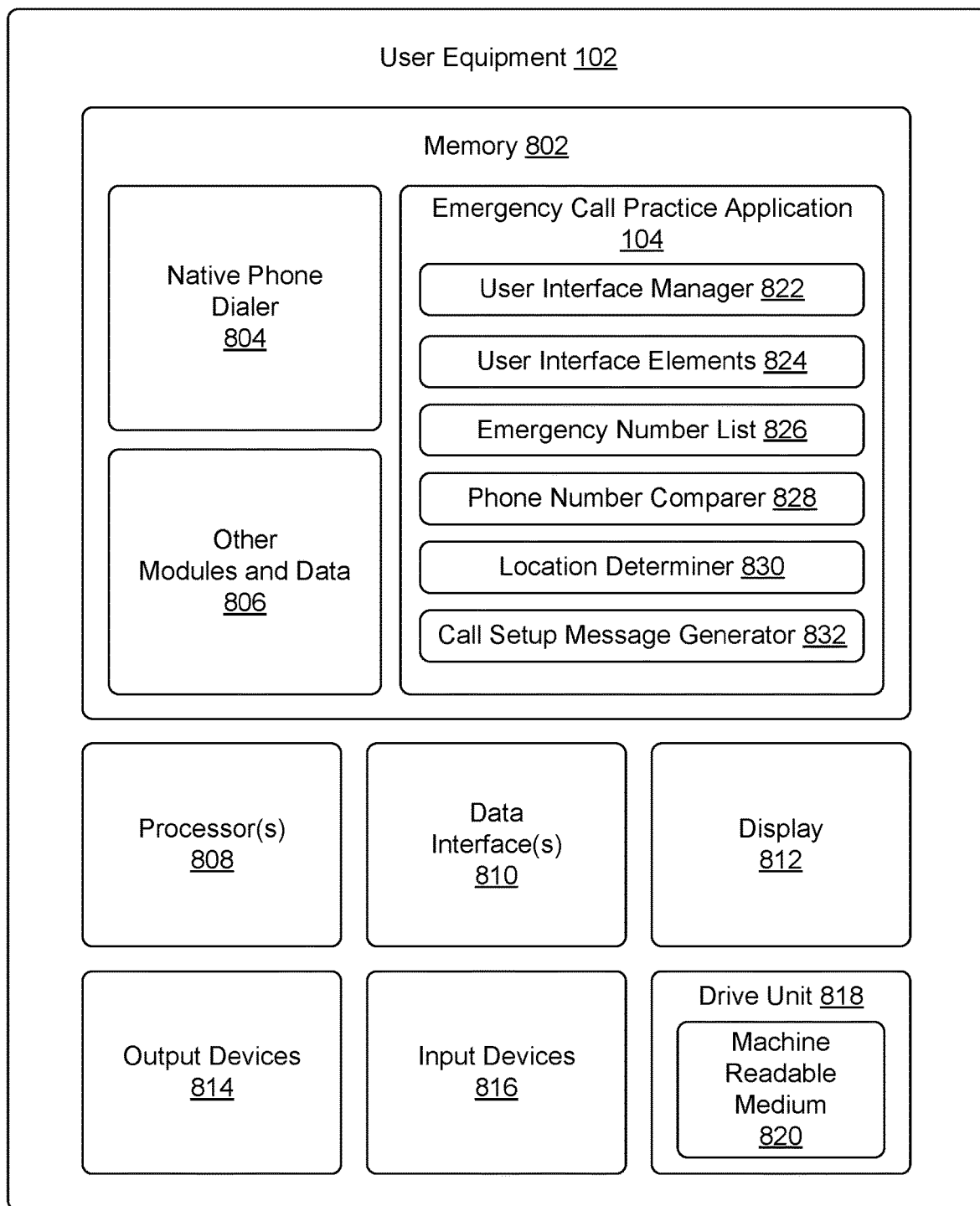
FIG. 8 depicts an example system architecture for a UE.

FIG. 8 depicts an example system architecture for a UE 102, in accordance with various examples. As shown, a UE 102 can have memory 802 storing an emergency call practice application 104, a native phone dialer 804, and other modules and data 806. A UE 102 can also have processor(s) 808, data interfaces 810, a display 812, output devices 814, input devices 816, and/or a drive unit 818 including a machine readable medium 820.

In various examples, the memory 802 can include system memory, which may be volatile (such as RAM), non-volatile (such as ROM, flash memory, etc.) or some combination of the two. The memory 802 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The native phone dialer 804 can be a standard or default phone call dialing component for the UE 102, such as an application or operating system component. The native phone dialer 804 can be configured to receive user input associated with a phone number, and in response cause the UE 102 to initiate a phone call from the UE 102 to that phone number. For example, the native phone dialer 804 can receive user input such as digits of a phone number entered by a user via a keypad or other user interface, a user selection of a contact with a pre-stored phone number, a sequence of presses of one or more hardware buttons 402 that is associated with an emergency number, or any other user input that identifies a phone number to be called. In response to user input associated with a selected phone number, in some examples the native phone dialer 804 can cause the UE 102 to send a call setup message 608, such as a SIP INVITE message, to a telecommunication network to initiate a phone call to the selected phone number.

The emergency call practice application 104 can be an application that executes on the UE 102, such as a downloadable application or a native application that is preinstalled on the UE 102. In other examples, the emergency call practice application 104 can be a component of the operating system of the UE 102, such as a built-in alternative to the native phone dialer 804. In still other examples, the emergency call practice application 104 can be part of the native phone dialer 804, and can be executed as an alternate mode of the native phone dialer 804 to practice emergency calls as described herein instead of initiating real phone calls.

The memory 802 can store computer-executable instructions and other data for the emergency call practice application 104, such as a user interface manager 822, user interface elements 824, an emergency number list 826, a phone number comparer 828, a location determiner 830, a call setup message generator 832, and/or other data.

The user interface manager 822 can select and display user interface elements 824 on the display 812 while the emergency call practice application 104 is executing on the UE 102. The user interface manager 822 can also receive user input via user selections of user interface elements, and change the user interface to reflect user input, provide feedback to a user, reflect determinations made by the emergency call practice application 104, and/or for any other reason.

The user interface elements 824 can be visual, audio, and/or other elements associated with the user interface of the emergency call practice application 104. The user interface elements 824 can include text, graphics, and/or other visual elements for the keypad 106, dialed number display 108, dial button 110, practice mode indicators 112, user feedback 202, close option 204, native phone dialer option 206, local emergency number list 302, silent dialing sequence indicator 404, practice mode setting option 502, and/or any other element of the user interface. In some examples, the user interface elements 824 can also include audio files, such as a prerecorded local audio file that can be played as user feedback 202 to inform a user that the user has successfully practiced dialing an emergency phone number and/or should use the native phone dialer 804 if a real emergency is occurring.

As discussed herein, in some examples, the emergency call practice application 104 can emulate the user interface of the native phone dialer 804 such that a user experience of using the emergency call practice application 104 is substantially similar to a user experience of using the native phone dialer 804. In some examples, the user interface manager 822 may be configured to detect a hardware model and/or operating system of the UE 102, and select a set of user interface elements 824 for presentation that have been designed to mimic user interface elements of the native phone dialer 804 for that hardware model or operating system.

The emergency number list 826 can be a list, database, or other data that identifies one or more emergency numbers that are valid for a practice session. In some examples, the emergency number list 826 can include only valid emergency numbers. For example, when 9-1-1 is the emergency number to be practiced, the emergency number list 826 may include a single entry for 9-1-1. However, in other examples, the emergency number list 826 can include a set of emergency numbers, such as different emergency numbers used in different countries, but mark individual emergency numbers as valid or not valid for a current practice session based on user settings, network information, and/or a location of the UE 102. For example, the emergency number list 826 can include a list of emergency numbers including 9-1-1 and 1-1-2, but mark 9-1-1 as valid and 1-1-2 as not valid when the UE 102 is located in a country where 9-1-1 is used as the main emergency number instead of 1-1-2, or when a user has set 9-1-1 as the specific emergency number to be practiced. In examples in which multiple emergency numbers are used for different types of emergency services, the emergency number list 826 can mark multiple emergency numbers as being valid for a particular practice session, or mark one of them as valid if a user desires to practice dialing a single one of the emergency numbers that is associated with a particular emergency service.

In some examples, the emergency call practice application 104 can receive emergency numbers for the emergency number list 826 from a telecommunication network. For example, when the UE 102 attaches to a telecommunication network, for instance by connecting to a base station of an access network 602, in some examples the telecommunication network can provide a list of one or more local emergency numbers. In this situation, the emergency call practice application 104 can add the received local emergency numbers to the emergency number list 826 if they are not already included, and/or can mark the received local emergency numbers as being valid for a practice session within the emergency number list 826.

In some examples, the emergency number list 826 can also contain mappings of emergency numbers to identifiers for associated test servers 616. For example, the emergency number list 826 can indicate that a test server 616 corresponding with an emergency number of 9-1-1 has a test phone number of "911-911-2911," is associated with a domain name such as "example.com," and/or is associated with a destination identifier 612 of "9119112911@example.com."

The phone number comparer 828 can compare a phone number dialed via the emergency call practice application 104 against emergency numbers that have been marked as valid in the emergency number list 826. The phone number comparer 828 can inform the user interface manager 822 whether the dialed phone number matches a valid emergency number, such that the user interface manager 822 can change the user interface to present user feedback 202 regarding whether the successfully dialed a valid emergency number or did not successfully dial a valid emergency number. In some examples, the phone number comparer 828 or another element of the emergency call practice application 104 can similarly compare a received sequence of presses of one or more hardware buttons 402 against a predefined "silent dialing" initiation sequences for emergency calls to determine whether the entered sequence would or would not cause the UE 102 to initiate an emergency call.

The location determiner 830 can determine a current location of the UE 102 based on Global Positioning System (GPS) or assisted GPS (A-GPS) functionality of the UE 102, identifiers of cell towers or base stations in an access network 602, cell tower triangulation, Global Positioning System (GPS) functionality of the UE 102, cell tower triangulation, or by any other geolocation technique. In some example, the location determiner 830 can retrieve or access location information already determined and stored by an operating system or other elements of the UE 102.

In some examples, the emergency call practice application 104 can use the current location of the UE 102 determined by the location determiner 830 to determine which emergency numbers are to be marked as valid in the emergency number list 826. For example, when the location determiner 830 determines that the UE 102 has traveled to a country that uses 1-1-2 as an emergency number instead of 9-1-1, the emergency call practice application 104 can change the emergency number list 826 to mark 1-1-2 as a valid emergency number for practice sessions. In some examples, the location of the UE 102 determined by the location determiner 830 can also be used to determine one or more local emergency numbers to be displayed in a local emergency number list 302, as shown in FIG. 3.

The call setup message generator 832 can generate a call setup message 608, such as a SIP message, for a practice emergency call when the phone number comparer 828 indicates that a user has provided user input to initiate a practice emergency call, such as when digits dialed by the user in the emergency call practice application 104 match valid emergency number or when presses of one or more hardware buttons 402 by a user matches a valid "silent dialing" button sequence for an emergency call. The call setup message generator 832 can use the emergency number list 826 or other data to determine a destination identifier 612 of a test server 616 that matches the emergency phone number dialed by a user or prompted by a silent dialing button sequence, and can add that destination identifier 612 to the generated call setup message 608. The call setup message generator 832 can also add a service identifier 610 to the generated call setup message 608, such "service:sos" as when the phone number is a generic emergency number, or "service:sos.ambulance" or other service-specific service identifier 610 when the phone number is associated with a specific type of emergency service.

The other modules and data 806 can be utilized by the UE 102 to perform or enable performing any action taken by the UE 102 and/or the emergency call practice application 104, as described herein. The modules and data 806 can include a UE platform, operating system, and applications, and data utilized by the platform, operating system, and applications.

In various examples, the processor(s) 808 can be a central processing unit (CPU), a graphics processing unit (GPU), or both CPU and GPU, or any other type of processing unit. Each of the one or more processor(s) 808 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 808 may also be responsible for executing all computer applications stored in the memory 802, which can be associated with common types of volatile (RAM) and/or nonvolatile (ROM) memory.

The data interfaces 810 can include transceivers, modems, interfaces, antennas, and/or other components that perform or assist in exchanging data with other devices. In some examples, the data interfaces 810 can exchange radio frequency (RF) communications with a base station of an access network 602, a Wi-Fi access point, or otherwise implement connections with one or more networks. The data interfaces 810 can be compatible with wireless and/or wired connection types or technologies, including 5G wireless access technologies, 4G/LTE wireless access technologies, Wi-Fi, and/or any other type of wireless or wired connection.

The display 812 can be a liquid crystal display or any other type of display commonly used in UEs 102. For example, display 812 may be a touch-sensitive display screen, and can then also act as an input device or keypad, such as for providing a soft-key keyboard, navigation buttons, or any other type of input. The user interface of the emergency call practice application 104, including a keypad 106, dialed number display 108, dial button 110, and/or other user interface elements, can accordingly be presented to users via the display 812, and user input associated with such user interface elements may be received via the display.

The output devices 814 can include any sort of output devices known in the art, such as a display 812, speakers, a vibrating mechanism, and/or a tactile feedback mechanism. Output devices 814 can also include ports for one or more peripheral devices, such as headphones, peripheral speakers, and/or a peripheral display.

The input devices 816 can include any sort of input devices known in the art. For example, input devices 816 can include a microphone, a keyboard/keypad, hardware buttons 402, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 820 can store one or more sets of instructions, such as software or firmware, that embodies any one or more of the methodologies or functions described herein. The instructions can also reside, completely or at least partially, within the memory 802, processor(s) 808, and/or data interface(s) 810 during execution thereof by the UE 102. The memory 802 and the processor(s) 808 also can constitute machine readable media 820.

Example Operations

Figure 9:
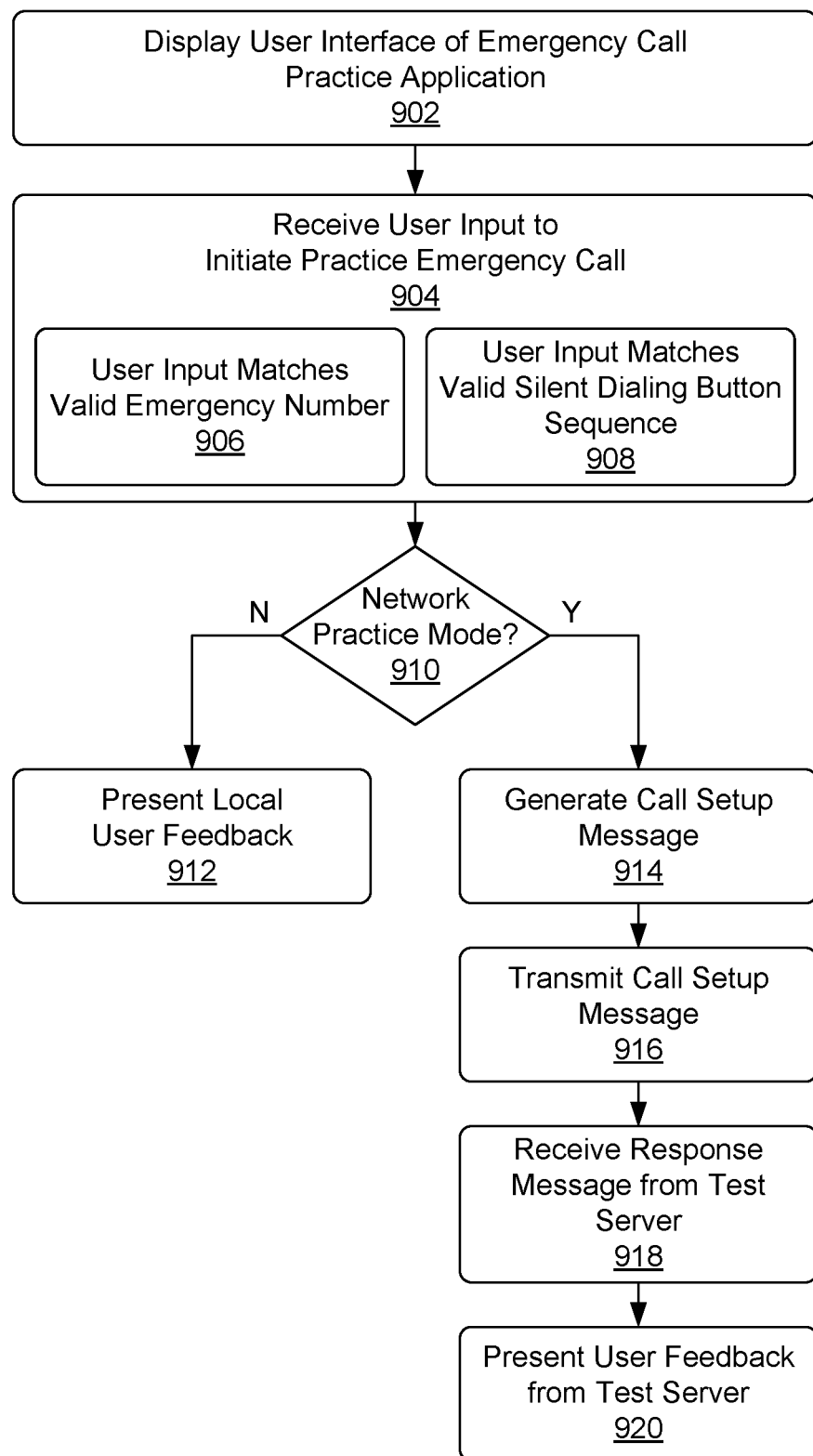
FIG. 9 depicts a flowchart of an example process for practicing an emergency call via an emergency call practice application.

FIG. 9 depicts a flowchart of an example process for practicing an emergency call via an emergency call practice application 104 executing on a UE 102.

At block 902, the emergency call practice application 104 can display a user interface on a screen of the UE 102. The user interface may also emulate or resemble a user interface for a native phone dialer 804 of the UE 102, in some examples with the addition of one or more practice mode indicators 112, a local emergency number list 302, a silent dialing sequence indicator 404, a practice mode setting option 502, and/or other user interface elements. In some examples, the user interface can be or resemble the user interfaces shown in FIGS. 1-5. In examples in which the user interface presents a local emergency number list 302, the emergency call practice application 104 may follow the process described below with respect to FIG. 10 during block 902.

At block 904, the emergency call practice application 104 can receive user input to initiate a practice emergency call. In some examples, block 904 can include receiving user input of digits of a dialed phone number via the emergency call practice application 104 and determining that the dialed phone number matches a valid emergency number at block 906. In other examples, block 904 can include receiving information about a sequence of presses of one or more hardware buttons 402 and determining that the sequence of presses of the one or more hardware buttons 402 matches a predefined "silent dialing" sequence associated with initiation of an emergency call to an emergency number at block 908.

At block 910, the emergency call practice application 104 can determine if it is in a network practice mode. If the emergency call practice application 104 is not in a network practice mode, the emergency call practice application 104 can move to block 912 and present local user feedback 202 to indicate that a user has successfully dialed a valid emergency number or has successfully practiced pressing a silent dialing sequence for an emergency call. In some examples, at block 912 the emergency call practice application 104 can also present a close option 204 and/or native phone dialer option 206 in addition to the user feedback 202, as discussed above with respect to FIG. 2. However, if the emergency call practice application 104 is in a network practice mode, the emergency call practice application 104 can move to block 914.

At block 914, the emergency call practice application 104 can generate a call setup message 608 for the practice emergency call. The call setup message 608 can include a service identifier 610 that identifies a general emergency service type, or a specific emergency type that corresponds to the emergency number that was dialed by a user or that is associated with an entered silent dialing sequence. The call setup message 608 can also include a destination identifier 612 that corresponds to an identifier of a test server 616 associated with the emergency number. For example, if an emergency number dialed via the emergency call practice application 104 is 9-1-1, the emergency call practice application 104 can generate a call setup message 608 with a destination identifier 612 of "9119112911@domain.com," which corresponds to a test server 616 previously set up in a telecommunication network to handle practice emergency calls to 9-1-1, rather a destination identifier 612 associated with a real PSAP 614.

At block 916, the emergency call practice application 104 can cause the UE 102 to transmit the call setup message 608. In some examples, the UE 102 can set up a dedicated connection with an access network 602 and/or core network 604 to transmit the call setup message 608. The transmitted call setup message 608 can eventually be routed through an IMS 606 to a PSAP routing server 620, which can forward the call setup message 608 to the test server 616 based on the destination identifier 612.

At block 918, the emergency call practice application 104 can receive a response message 622 from the test server 616 in response to the call setup message 608, and the practice emergency call can be connected between the UE 102 and the test server 616.

At block 920, the emergency call practice application 104 can receive and/or present user feedback 202 from the test server 616, for example by playing an audio message from the test server 616 that informs the user that the practice emergency call has successfully been connected.

Figure 10:
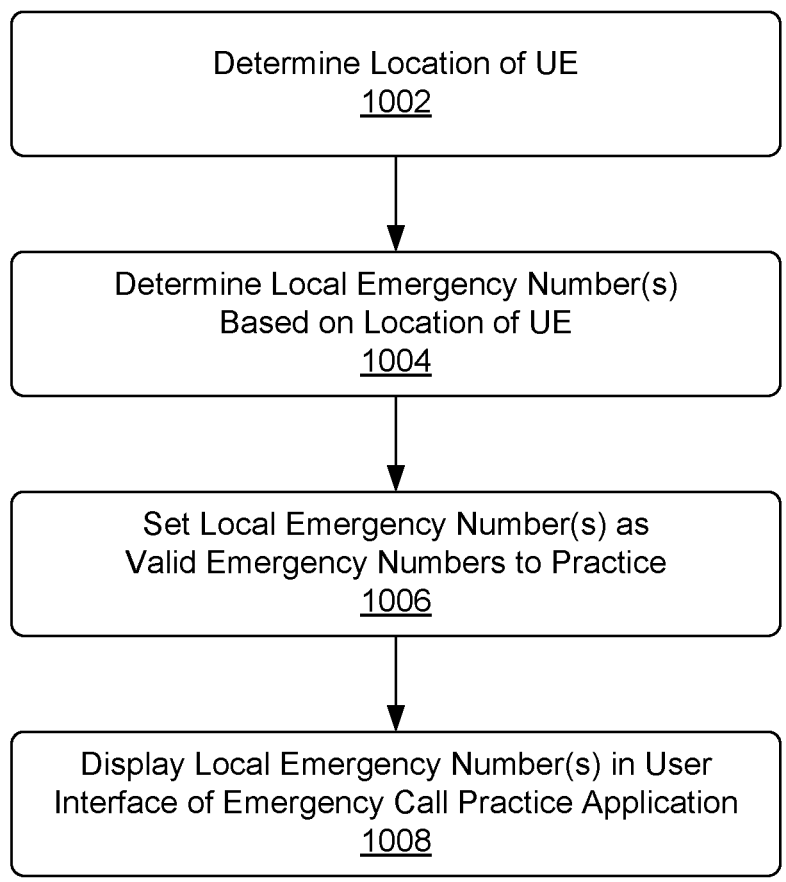
FIG. 10 depicts a flowchart of an example process for displaying a local emergency number list in a user interface of an emergency call practice application.

FIG. 10 depicts a flowchart of an example process for displaying a local emergency number list 302 in a user interface of an emergency call practice application 104. In various examples, the process shown in FIG. 10 can occur during block 902 of FIG. 9, upon a user instruction to display a local emergency number list 302, and/or be initiated in any other manner.

At block 1002, the emergency call practice application 104 can determine a current location of the UE 102. In some examples, a location determiner 830 of the emergency call practice application 104 can determine GPS coordinates or other geolocation information that represent a current location of the UE 102. As another example, the emergency call practice application 104 can determine a current location of the UE 102 based on a connection to a base station of an access network 602.

At block 1004, the emergency call practice application 104 can determine one or more local emergency numbers based on the current location of the UE 102. In some examples, the emergency call practice application 104 may have an emergency number list 826 that identifies local emergency numbers for different geographical locations, such that the emergency call practice application 104 can find local emergency numbers that correspond to the current location of the UE 102. In other examples, the emergency call practice application 104 may receive a list of one or more local emergency numbers based on attachment process that connects the UE 102 to a base station of an access network 602.

At block 1006, the emergency call practice application 104 can set the local emergency numbers as valid emergency numbers to be practiced via the emergency call practice application 104. For example, if the UE 102 has moved to a new location that uses 1-1-2 as a local emergency number instead of 9-1-1, the emergency call practice application 104 can set 1-1-2 as the emergency number to be practiced instead of 9-1-1.

At block 1008, the emergency call practice application 104 can also, or alternately, display the one or more local emergency numbers in a local emergency number list 302 in a user interface of the emergency call practice application 104.

Figure 11:
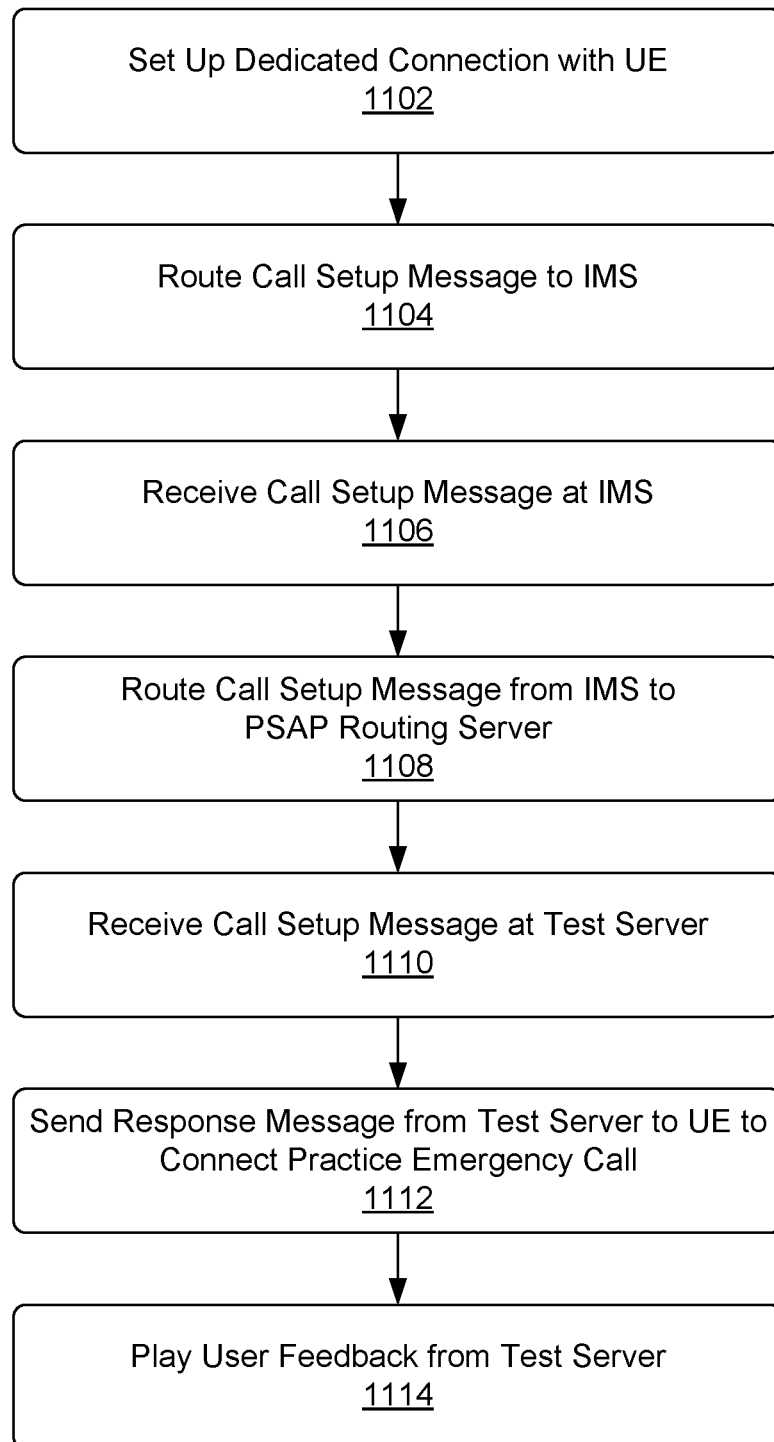
FIG. 11 depicts a flowchart of an example process for a telecommunication network to route a call setup message that originated from an emergency call practice application.

FIG. 11 depicts a flowchart of an example process for a telecommunication network to route a call setup message 608 that originated from an emergency call practice application 104. In FIG. 11, a test server 616 can be provided in the telecommunication network and can be registered with a PSAP routing server 620 as if the test server 616 were a PSAP 614. For example, a destination identifier 612 for the test server 616 can be registered with the PSAP routing server 620. The test server 616 can thus be located at the same relative position as a PSAP 614 with respect to the PSAP routing server 620.

At block 1102, the telecommunication network can set up a dedicated connection 618 with a UE 102. For example, if an emergency call practice application 104 generates a call setup message 608 with a service identifier 610 associated with a type of emergency services, the UE 102 may send an attachment request to a base station of an access network 602 to set up a dedicated connection 618 that has a higher priority than other types of connections, such as an E-PDN session, E-PDU session, WPS session. In examples, the attachment request or other data from the UE 102 can indicate a high-priority ARP value or other high priority indicator to signal that the UE 102 is requesting a dedicated connection 618. Accordingly, upon receipt of such a request from the UE 102, the telecommunication network can set up a dedicated connection 618 with a UE 102 during block 1102. In some examples, block 1102 can be absent or skipped, for instance if the UE 102 has not requested a dedicated connection 618 or if the UE 102 sends a call setup message 608 to an IMS 606 through a connection type that avoids an access network 602 and/or core network 604 of a network operator as shown in FIG. 7.

At block 1104, an access network 602 and/or core network 604 telecommunication network can receive a call setup message 608 generated by an emergency call practice application 104 from a UE 102, and route the call setup message 608 to an IMS 606. In some examples, the call setup message 608 can be received and routed over a dedicated connection 618 as discussed above. However, if block 1102 is absent or was skipped, at block 1104 the call setup message 608 can be routed to an IMS 606 through the access network 602 and/or core network 604 over a non-dedicated connection. If the UE 102 sends a call setup message 608 to an IMS 606 through the Internet or another connection type that avoids an access network 602 and/or core network 604 of a network operator as shown in FIG. 7, block 1104 can also be absent or skipped.

At block 1106, the IMS 606 can receive a call setup message 608 generated by an emergency call practice application 104. As discussed above, the call setup message 608 may be received by the IMS 606 through a dedicated or non-dedicated connection through an access network 602 and/or core network 604 of a network operator, or through an Internet connection or other connection type.

At block 1108, the IMS 606 can route the call setup message 608 to a PSAP routing server 620. For example, one or more nodes of the IMS 606 can determine from a service identifier 610 and/or a destination identifier 612 that the call setup message 608 is associated with an emergency call, and accordingly route the call setup message 608 to a PSAP routing server 620 that is configured to handle routing for emergency calls. In some examples, the PSAP routing server 620 can be a third-party server. In other examples, the PSAP routing server 620 can operated by the same operator that operates the IMS 606. As noted above, the PSAP routing server 620 can be configured to route call setup messages 608 for real emergency calls to PSAPs 614, but be configured to recognize the destination identifier 612 in the call setup message 608 from the emergency call practice application 104 as being associated with the test server 616 such that the PSAP routing server 620 forwards the call setup message 608 from the emergency call practice application 104 to the test server 616. Accordingly, the test server 616 can receive the call setup message 608 at block 1110.

At block 1112, the test server 616 can send a response message 622 back to the UE 102 to connect the practice emergency call. At block 1114, once the practice emergency call has been connected with the UE 102, the test server 616 can also play user feedback 202 over the practice emergency call connection, such as a prerecorded audio file indicating that the user has successfully practiced an emergency call and/or that the telecommunication network successfully routed the practice emergency call.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
    detecting, via an emergency call practice application executing on a user equipment (UE), a current location of the UE;
    determining, by the emergency call practice application, one or more local emergency numbers associated with the current location of the UE;
    receiving, via the emergency call practice application, user input associated with dialing one of the one or more local emergency numbers, wherein the dialing one of the one or more local emergency numbers by the UE directs a call to a Public Safety Answering Point (PSAP) over a telecommunication network;
    generating, by the emergency call practice application, a call setup message that includes a destination identifier of a test server associated with the dialed emergency number, wherein the destination identifier of the test server in the call setup message is configured to redirect, over the telecommunication network, the call to the test server rather than the PSAP;
    causing, by the emergency call practice application, the call setup message to be transmitted by the UE to the telecommunication network to the test server rather than the PSAP; and
    receiving, by the emergency call practice application, a response message from the test server that confirms that the test server successfully received the call setup message from the UE.

2. The method of claim 1, further comprising:
    connecting, by the emergency call practice application, a practice emergency call with the test server based on receiving the response message; and
    presenting, by the emergency call practice application, user feedback from the test server via the UE.

3. The method of claim 1, wherein the destination identifier is a phone number associated with the test server that is different from the emergency number.

4. The method of claim 1, wherein generating the call setup message comprises including a service identifier associated with a type of emergency service corresponding to the emergency number.

5. The method of claim 1, wherein a user interface of the emergency call practice application displays at least one practice mode indicator configured to inform a user that the emergency call practice application is different from a native phone dialer of the UE.

6. The method of claim 5, wherein the at least one practice mode indicator is a countdown timer.

7. The method of claim 1, wherein the user input is a sequence of digits dialed by a user that match the emergency number.

8. The method of claim 1, wherein the user input is a sequence of presses of one or more hardware buttons on the UE that match a predefined silent dialing sequence associated with the emergency number.

9. The method of claim 8, further comprising displaying, by the emergency call practice application, a silent dialing sequence indicator in a user interface that indicates the predefined silent dialing sequence.

10. The method of claim 1, further comprising
displaying, by the emergency call practice application, a list of the one or more local emergency numbers in a user interface.

11. The method of claim 10, further comprising causing, by the emergency call practice application, the UE to establish a dedicated connection with the telecommunication network, wherein the UE transmits the call setup message to the telecommunication network via the dedicated connection.

12. The method of claim 1, wherein the emergency call practice application has a local practice mode wherein the user input is locally compared by the emergency call practice application against one or more predefined emergency numbers to verify that the user input matches the emergency number.

13. A user equipment (UE) comprising:
one or more processors; and
memory storing computer-executable instructions that, when executed by the one or more processors, cause the UE to perform operations comprising:
detecting, via an emergency call practice application executing on a user equipment (UE), a current location of the UE;
determining, by the emergency call practice application, one or more local emergency numbers associated with the current location of the UE;
receiving, via the emergency call practice application, user input associated with dialing one of the one or more local emergency numbers, wherein the dialing one of the one or more local emergency numbers by the UE directs a call to a Public Safety Answering Point (PSAP) over a telecommunication network;
generating, by the emergency call practice application, a call setup message that includes a destination identifier of a test server associated with the dialed emergency number, wherein the destination identifier of the test server in the call setup message is configured to redirect, over the telecommunication network, the call to the test server rather than the PSAP;
transmitting the call setup message to the telecommunication network to the test server rather than the PSAP; and
receiving a response message from the test server that confirms that the test server successfully received the call setup message from the UE.

14. The UE of claim 13, wherein the operations further comprise:
connecting a practice emergency call with the test server based on receiving the response message; and
presenting user feedback from the test server.

15. The UE of claim 13, wherein generating the call setup message comprises including a service identifier associated with a type of emergency service corresponding to the emergency number.

16. The UE of claim 13, wherein a user interface of the emergency call practice application displays at least one practice mode indicator configured to inform a user that the emergency call practice application is different from a native phone dialer of the UE.

17. One or more non-transitory computer-readable media storing computer-executable instructions that, when executed by one or more processors of a user equipment (UE), cause the one or more processors to perform operations comprising:
detecting, via an emergency call practice application executing on a user equipment (UE), a current location of the UE;
determining, by the emergency call practice application, one or more local emergency numbers associated with the current location of the UE;
receiving, via the emergency call practice application, user input associated with dialing one of the one or more local emergency numbers, wherein the dialing one of the one or more local emergency numbers by the UE directs a call to a Public Safety Answering Point (PSAP) over a telecommunication network;
generating, by the emergency call practice application, a call setup message that includes a destination identifier of a test server associated with the dialed emergency number, wherein the destination identifier of the test server in the call setup message is configured to redirect, over the telecommunication network, the call to the test server rather than the PSAP;
transmitting the call setup message to the telecommunication network server rather than the PSAP; and
receiving a response message from the test server that confirms that the test server successfully received the call setup message from the UE.

18. The one or more non-transitory computer-readable media of claim 17, wherein the operations further comprise:
connecting a practice emergency call with the test server based on receiving the response message; and
presenting user feedback from the test server.

19. The one or more non-transitory computer-readable media of claim 17, wherein generating the call setup message comprises including a service identifier associated with a type of emergency service corresponding to the emergency number.

20. The one or more non-transitory computer-readable media of claim 17, wherein a user interface of the emergency call practice application displays at least one practice mode indicator configured to inform a user that the emergency call practice application is different from a native phone dialer of the UE.

* * * * *